United States Patent [19]

Hayashi

[11] Patent Number: 4,480,609
[45] Date of Patent: Nov. 6, 1984

[54] FRONT COVER OF AUTOMOTIVE ENGINE

[75] Inventor: Yoshimasa Hayashi, Kamakura, Japan

[73] Assignee: Nissan Motor Company, Limited, Yokohama, Japan

[21] Appl. No.: 313,304

[22] Filed: Oct. 20, 1981

[30] Foreign Application Priority Data

Oct. 23, 1980 [JP] Japan .................... 55-151523[U]

[51] Int. Cl.$^3$ ................................. F02B 7/00
[52] U.S. Cl. ........................... 123/195 C; 123/198 E; 220/359
[58] Field of Search ........... 123/195 R, 195 C, 198 E, 123/90.38; 181/204; 74/606 R; 248/205 A; 220/359

[56] References Cited

U.S. PATENT DOCUMENTS

| | | | |
|---|---|---|---|
| 3,092,203 | 6/1963 | Slayter | 428/442 |
| 3,112,810 | 12/1963 | Nallinger | 123/198 E |
| 3,576,142 | 4/1971 | Matthews | 74/606 R |
| 3,616,096 | 10/1971 | Roeder | 248/205 A |
| 3,822,763 | 7/1974 | Adams et al. | 123/198 E |
| 4,048,366 | 9/1977 | Kingsbury | 123/195 C |
| 4,101,003 | 7/1978 | Timour et al. | 123/198 E |
| 4,213,440 | 7/1980 | Abe et al. | 123/195 C |

FOREIGN PATENT DOCUMENTS

| | | | |
|---|---|---|---|
| L 6137 | 7/1951 | Fed. Rep. of Germany . | |
| 2012564 | 9/1973 | Fed. Rep. of Germany . | |
| 2344062 | 3/1974 | Fed. Rep. of Germany . | |
| 2739074 | 3/1978 | Fed. Rep. of Germany . | |
| 2848503 | 5/1980 | Fed. Rep. of Germany . | |
| 2904688 | 8/1980 | Fed. Rep. of Germany . | |
| 0161941 | 12/1980 | Japan . | |
| 1400447 | 7/1975 | United Kingdom | 123/195 C |
| 2037887 | 6/1980 | United Kingdom . | |

*Primary Examiner*—Craig R. Feinberg
*Attorney, Agent, or Firm*—Schwartz, Jeffery, Schwaab, Mack, Blumenthal & Koch

[57] ABSTRACT

A front cover for covering gears and a belt located in the vicinity of the front surface of an automotive engine body, the front cover being made of a soft material which is high in vibration-damping capacity and sticked on the front surface of the engine body, thereby effectively suppressing the vibration of the front cover itself though engine vibration is transmitted thereto, and completely protecting the gears and belt from foreign substances.

7 Claims, 6 Drawing Figures

FRONT COVER OF AUTOMOTIVE ENGINE

BACKGROUND OF THE INVENTION

1. Field of the Invention

This invention relates generally to an improvement in a front cover disposed on the front surface of an internal combustion engine body for an automotive vehicle, and more particularly to the front cover adapted to achieve the reduction of noise-level caused by moving parts in the vicinity of the engine body front surface.

2. Description of the Prior Art

Covers for moving parts projecting from the outer surface of an internal combustion engine body, as in a front cover or timing cover, traditionally have been formed from sheet metal. Solid sheet metal is hardly a vibration or sound absorbing material; in fact, solid metal is one of the best sound and vibration conductors as well known. When the front cover is rigidly mounted to an internal combustion engine, which of course, it must be in order to perform its intended function, the cover itself becomes an excellent conductor of noise and vibration produced by the internal combustion engine body. In fact, due to the shape of a certain type of such cover having large, essentially flat section, this cover becomes an excellent amplifier of engine noise. Additionally, engine vibration is transmitted to the front cover, thus creating another or secondary source of noise, i.e. generating the vibration of the cover itself.

SUMMARY OF THE INVENTION

In accordance with the present invention, a front cover for covering the moving parts located in the vicinity of the front surface of an automotive engine body is formed of a soft material which is high in vibration-damping capacity and is stuck on the front surface of the engine body with an adhesive. Accordingly, the vibration of the front cover can be effectively suppressed though the engine body vibration is transmitted to the front cover, thus lowering noise to be radiated from the front cover. Also, with the present invention, that the moving parts within the front cover can be completely protected from foreign substances.

DESCRIPTION OF THE DRAWINGS

The features and advantages of the engine front cover according to the present invention will be more clearly appreciated from the following description taken in conjunction with the accompanying drawings in which like reference numerals designate corresponding parts and elements, and in which.

DETAILED DESCRIPTION OF THE INVENTION

Figure 1:
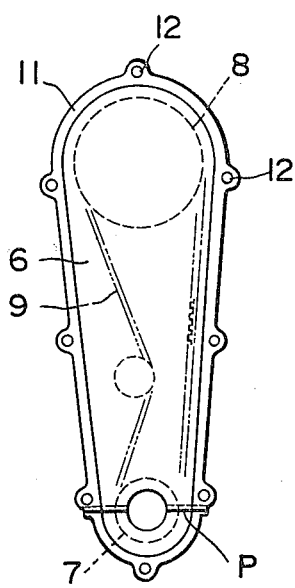
FIG. 1 is a front elevation of a conventional front cover for use in the front section of an engine body.
Figure 2:
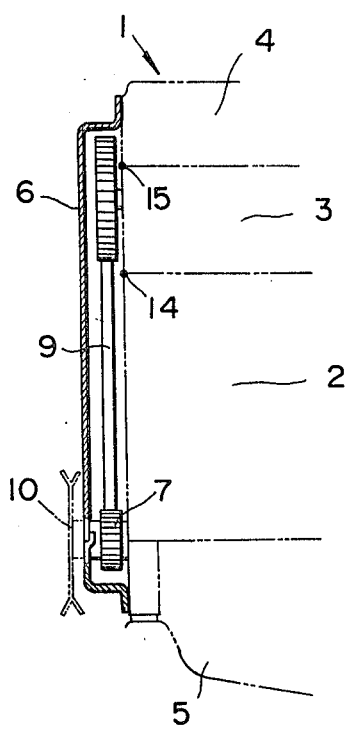
FIG. 2 is a vertical sectional view of the front cover of FIG. 1.
Figure 3:
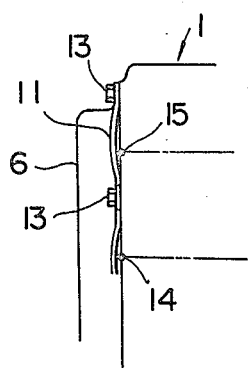
FIG. 3 is a side view showing the state of installation of the front cover of FIG. 1.

To facilitate understanding the present invention, a brief reference will be made to a conventional front cover which is in general installed at the front section of an engine body 1 of an automotive vehicle to cover various parts on the engine body front section, depicted in FIGS. 1 to 3. Referring to FIGS. 1 to 3, the engine body 1 is composed of a cylinder block 2, a cylinder head 3, a rocker cover 4, and an oil pan 5. The front cover 6 is disposed at the surface of the front section of the engine body 1 to cover, for example, a drive gear 7 securely mounted on an end of a crankshaft, another gear 8 securely mounted on an end of a camshaft, and a toothed belt 9 passed over the gears 7 and 8, so that the gears 7, 8 and the belt 9 can be protected from water, foreign substances and the like. In this example, the front cover 6 is divided into an upper larger section and a lower smaller section at a partition section P in the vicinity of the above-mentioned end of the crankshaft, and accordingly the front cover 6 is detachable relative to the engine body front section without removing a crank pulley 10. The front cover 6 has an installation flange portion 11 which is suitably formed with small holes 12, so that the front cover 6 is secured on the engine body front section by means of bolts 13 passing through the small holes 12.

However, since the front cover 6 of this type is in general formed of relatively thin sheet metal or hard plastic and rigidly connected to the engine body front section through the bolts 13, the front cover 6 tends to be readily vibrated by the vibration of the engine body due to engine combustion and reciprocating motion of engine pistons, which front cover vibration becomes a secondary noise source to radiate higher level noise out of the automotive vehicle. Additionally, because of the hard material of the front cover 6, a gap or opening is unavoidably produced between the front cover flange portion and the surface of the engine body front section even if only a slight offset is formed at a portion 14 of the engine body front section surface where the cylinder block 2 and the cylinder head 3 contact each other and/or at another portion 15 of the engine body front section surface where the cylinder head 3 and the rocker cover 4 contact each other. Additionally, the installation flange portion 11 tends to rise or come up at the portions located between the bolts 13, thus producing gaps or openings between the front cover 6 and the engine body front section surface. As a result, the noise generated by the gears 7, 8 etc leaks through these gaps to the outside of the engine. Besides, foreign substances such as dust are liable to enter inside the front cover 6 through these gaps, in which such foreign substances adhere to the toothed belt 9 to promote the wear of the belt 9.

Figure 4:
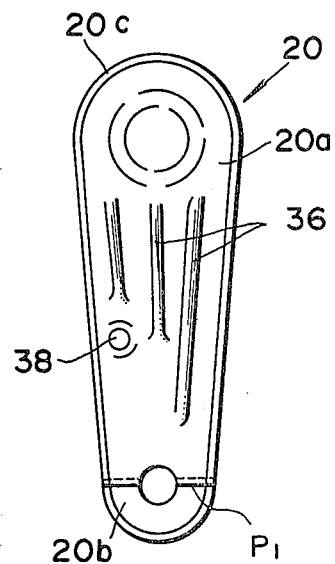
FIG. 4 is a front elevation of a front cover according to the present invention, for use in the front section of an automotive internal combustion engine body.
Figure 5:
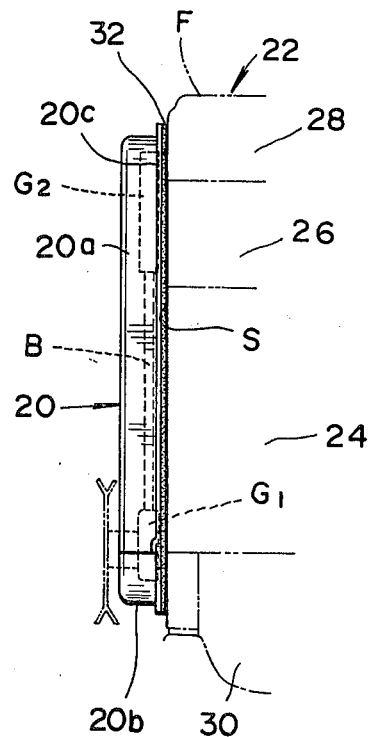
FIG. 5 is a side elevation of the front cover of FIG. 4.
Figure 6:
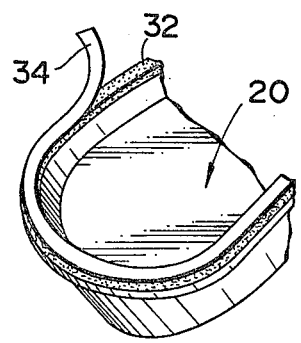
FIG. 6 is a perspective view showing the state of the front cover provided with a gasket.

In view of the above description of the conventional front cover or timing cover of the automotive vehicle engine, reference is now made to FIGS. 4 to 6, wherein a preferred embodiment of a front cover according to the present invention is illustrated by the reference numeral 20. The front cover 20 is disposed on the flat surface S of the front section F of an internal combustion engine body 22 of an automotive vehicle, which engine body comprises, as usual, a cylinder block 24, a cylinder head 26, a rocker cover 28, and an oil pan 30. The front cover 20 is, as usual, adapted to cover a gear $G_1$ securely mounted on an end of a crankshaft (not shown), another gear $G_2$ securely mounted on an end of a camshaft (not shown), and a toothed belt B connecting the gears $G_1$, $G_2$. The belt B may be replaced with a chain.

The front cover 20 is formed of a light-weight and soft material which is high in vibration-damping capacity, which material is fibrous material impregnated with phenol resin, or polyurethane foam resin. The fibrous material is, for example, felt. In case of using the fibrous material impregnated with phenal resin, the front cover 20 is made by forming the fibrous material into a desired shape under heating. The front cover 20 is divided into an upper larger section 20a and a lower smaller section 20b at a partition section $P_1$ located in the vicinity of the above-mentioned end of the crankshaft. The front cover 20 is formed along its periphery with an installation flange portion 20c which has generally the same width throughout its whole length. The flange portion 20c is secured on the flat front surface S of the engine body front section F through a sponge-like or porous gasket 32 by using an adhesive, as shown in FIG. 5. Otherwise, the front cover flange portion 20c may be directly secured on the engine body section surface S without using the gasket 32. When using the gasket 32, the gasket 32 is previously secured at its lower surface on the surface of the front cover flange section 20c, for example, with an adhesive or by melting the lower surface of the gasket 32. The secured gasket 32 is provided at its upper surface with an adhesive which is previously applied, the applied adhesive being covered with a protector paper 34 before the installation of the front cover 20 to the engine body 22, as shown in FIG. 6. Preferably, the front cover 20 is formed at its surface with beads or straight projecting sections 36. The beads 36 make the front cover high in shape-maintaining ability or in rigidity, thereby making possible the use of a much lighter-weight and softer, high vibration-damping capacity material as the front cover 20. In FIG. 4, the reference numeral 38 denotes an operation hole through which the inspection of belt tension and the adjustment of a tensioner is carried out, thereby decreasing the frequency detaching the front cover 20. The operation hole 38 is to be covered with a cap (not shown) which is securable by being screwed or press-fitted.

With the above-mentioned arrangement of the front cover 20, even when the vibration of the engine body 22 is transmitted to the front cover 20, the front cover 20 is prevented from its vibration acting as a secondary noise source because the front cover 20 is formed of a relatively soft, high vibration-damping capacity material, thereby greatly decreasing noise to be radiated from the front cover 20. Besides, the installation flange portion 20c of the front cover 20 is tightly contacted throughout its whole length with the front surface S of the engine body, regardless of a slight unevenness formed on the engine body surface S which ueveness is caused at the locations where the cylinder block 24 contacts the cylinder head 26, and the cylinder head 26 contacts the rocker cover 28. Accordingly, the noise generated by the gears $G_1$, $G_2$ etc within the front cover 20 can be effectively prevented from being emitted, thereby achieving a further noise-level reduction of the engine. Moreover, foreign substances such as dust can be completely prevented from entering the inside of the front cover 20. This protects the toothed belt B from being damaged, thereby attaining a long life for the toothed belt B.

As is appreciated from the above, by using the front cover according to the present invention, a great reduction in engine noise-level can be achieved, accompanying the advantages that dust can be completely prevented from entering the inside of the front cover, and that a reduced weight of a whole engine can be attained.

What is claimed is:

1. A front cover for covering moving parts located in the vicinity of the front surface of an internal combustion engine body for an automotive vehicle, said moving parts comprising interconnected moving gears, said front cover comprising only a resin impregnated fibrous material which is high in vibration-damping capacity, said material being soft enough to prevent said cover itself from acting as a secondary noise source even upon receiving vibration from the engine body, said cover comprising a periphery, an elongate flange formed along the entire periphery of said cover, and means for producing a boltless attachment between said front cover and said engine body, said attachment means comprising a gasket adhered to said flange, said gasket having a surface containing adhesive and a removable paper protector over said adhesive, said protector being constructed so as to be removable leaving said adhesive exposed for attaching said front cover to said engine body only through said gasket and said adhesive.

2. A front cover as claimed in claim 1 wherein said cover has a peripheral edge and is adhered to said engine body along the full length of said peripheral edge.

3. A front cover as claimed in claim 1, wherein said fibrous material is felt.

4. A front cover as claimed in claim 1, wherein said front cover has a surface formed with beads to improve the vigidity.

5. A front cover as claimed in claim 1, wherein said interconnected gears comprise gears mounted respectively on a crank shaft and a cam shaft, and a belt interconnecting said gears.

6. A front cover as claimed in claim 1, wherein said resin is a phenol resin.

7. A front cover as claimed in claim 1, wherein said resin is a polyurethane foam resin.

* * * * *